F. SYMANZIK.
LUBRICATING DEVICE OF BALL BEARINGS.
APPLICATION FILED OCT. 4, 1918.

1,288,276.  Patented Dec. 17, 1918.

Witnesses:
Margarete Baumgärtner
Max Hoferig

Inventor:
Franz Symanzik

UNITED STATES PATENT OFFICE.

FRANZ SYMANZIK, OF SCHWEINFURT, GERMANY.

LUBRICATING DEVICE OF BALL-BEARINGS.

1,288,276.   Specification of Letters Patent.   Patented Dec. 17, 1918.

Application filed October 4, 1918.  Serial No. 256,925.

*To all whom it may concern:*

Be it known that I, FRANZ SYMANZIK, a subject of the King of Prussia, residing at No. 1 Kesslergasse, Schweinfurt, in Germany, have invented new and useful Improvements in Lubricating Devices of Ball-Bearings, of which the following is a specification.

This invention relates to a device for the perfect and continuous lubrication of ball bearings and the like by circulation of the lubricating fluid or medium.

The object of the invention is to so arrange the bearing and its accessory parts that the row or rows of balls are separated from the oil chamber and to avail of the centrifugal force for driving the oil away from the rotating parts, while fresh oil will permanently be reconducted upon the operating parts to be lubricated.

To attain this object, the casing of the ball thrust bearing is provided with passages which unite the space encircling the ball series, with the space arranged between the ball series and the shaft or axle, through which passages the oil can be admitted again to the balls inside the row. Furthermore the lower part of the said outer space which is the oil reservoir is separated from the ball series by a plate or partition.

Another object of the invention is to so arrange the elements of the bearing that the said partition may easily be applied to a ball thrust bearing and removed therefrom at will for cleaning or other purposes, however effectively separating the ball series from the oil chamber, so that the balls will not be plunged but only constantly moistened by the circulating lubricant.

Further objects of the invention will be disclosed in the following description and claims.

Figure 1:
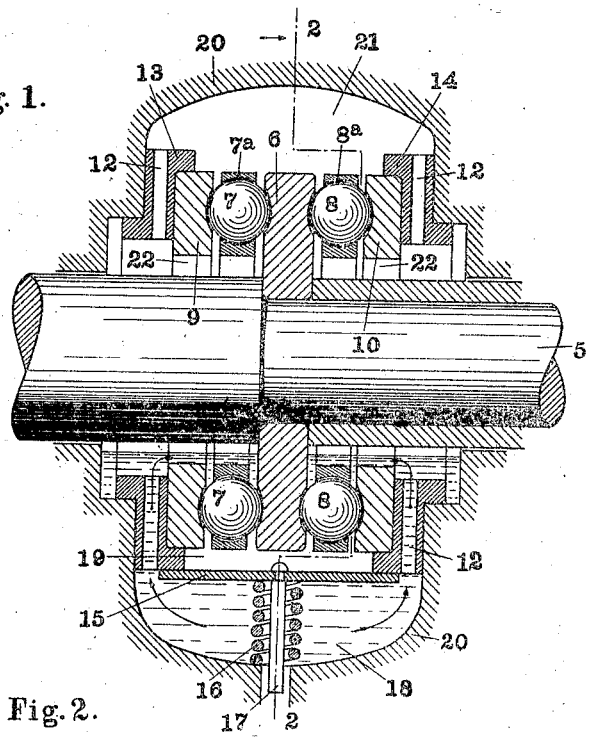
Figure 2:
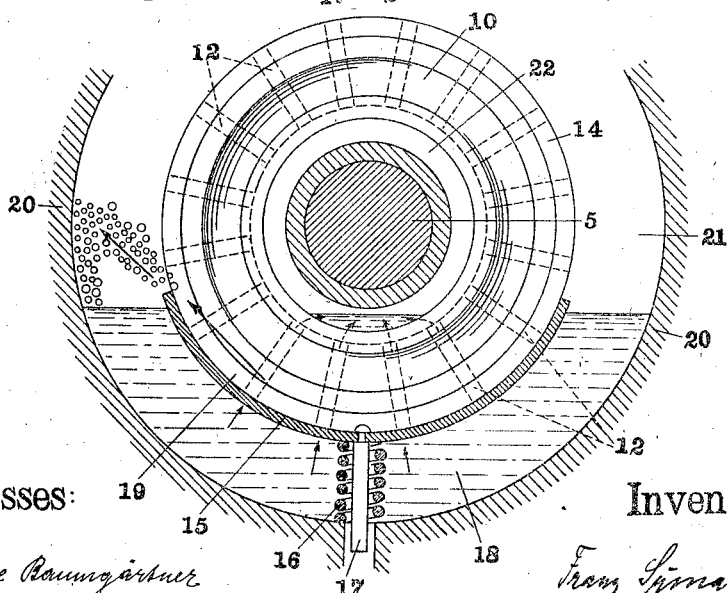

In the accompanying drawing which forms a part of this specification,

Figure 1 is a longitudinal sectional elevation of a thrust ball bearing provided with the lubricating means constructed according to the invention, and Fig. 2 illustrates a cross-section on the broken line 2—2 of Fig. 1.

Like numerals denote like parts throughout the figures of the drawing.

The ball thrust bearing represented in the drawing is composed of a bearing disk 6 unmovably fixed upon a rotating axle or shaft 5 by any suitable means, two bearing disks or plates 9 and 10 which are stationarily mounted in a box or casing 20, and two series of balls 7 and 8 held between the rotating disk 6 and the stationary disks 9 and 10, respectively, and rolling on concentric paths formed in the opposite faces of the said disks 6, 7 and 8, which paths have the usual concave shape. Preferably the balls of the single rows are spaced from one another by a spacer—or retainer—ring of any well known construction, for example, as shown and numbered 7ª and 8ª, respectively in the drawing.

The rings 9 and 10 are supported and coaxially held in the casing 20 through rings 13 and 14, respectively, by means of engaging flanges or the like. Bores or channels 12 provided in the said supporting rings 13 and 14 and distributed throughout or partly around their circumferences are made to connect or provide passages connecting the chamber or space 21 formed between the wall of the casing 20 and the periphery of the ball bearing, with the space or clearance 22 left between the shaft 5 or a part mounted thereon and the inner side of the series of balls 7 and 8 and race-rings 9 and 10. Said channels preferably possess radial direction. It may easily be understood that grooves cut in the rings or in the casing, or any other passages will have the same effect.

The separation of the ball bearing from the lower part of the chamber 21 which forms the receptacle 18 for the lubricant, as the oil there collects by gravity, is obtained by means of a partition located below the ball bearing and shutting its periphery off the space 18. A preferable form of said partition is illustrated in the drawing, where a cylindrically bent plate 15 is shown seated against the circular periphery of the rings 13 and 14 upon which it is pressed, thus undergoing a tightening and closing contact with said rings. The said plate 15 encircles about one third of the circumference of the rings 13 and 14, but its dimension may vary according to the level of the lubricant contained in the oil chamber 18; it being only required that its upwardly directed extremities prevent the overflow of the oil from the chamber 18 to the upper face of said plate. Any convenient means may be used to fix the said plate in its position rigidly or removably. For example, a pin 17 attached to the plate 15 and guided in a bore of the casing 20 with its free extremity can secure the plate against displacement, while a coiled spring 16 presses the plate 15 on the peripheries of the rings 13 and 14, so that a space 19 is formed above the plate 15 and between said rings which space is separated from the lubricant.

In the drawing two series of balls are shown which are operative in opposite directions, however, the lubricating device can also be used with one row of balls, if the shaft is only to be supported in one direction.

The operation of the lubricating device is as follows:

At the beginning of the rotation of the shaft the oil which at rest had collected in the space 19, will be thrown out in the direction of the arrows in Fig. 2 by the impulse received from the revolving disk 6, ball rows and their retainer rings, whereby it is supposed that said parts rotate clockwise. The oil spurted upon the wall of the casing 20 then passes down into the chamber 18, causing the rise of the level of the oil contained therein. Owing to the open communication presented by the passages 12, the oil will continuously flow from the receptacle 18 into the space 22, as indicated by the arrows, and be distributed to the series of balls 7 and 8 at their inner side, whereafter it is driven therethrough by the centrifugal force and then thrown out of the chamber 19, as disclosed heretofore. While a continuous circulation of the lubricant is established which will abundantly supply the balls and their races with oil, the partition 15 avoids stirring and whirling of the oil collected in the receptacle 18. Any impurities which might be contained in, or received by the oil are therefore permitted to deposit and thus be debarred from further circulation. Since any excess of the lubricant is permanently removed out of the chamber 19 during operation, loss of work by friction and eddying and consequent heating of the lubricant will greatly be reduced.

In the drawing a constructional embodiment of the invention has been represented for purpose of example, while in the foregoing specification several modifications have been mentioned. This will make it clear that the lubricating device can be performed in different ways.

What I, therefore, broadly claim as my invention, is—

1. In a device for lubrication, the combination with a thrust ball bearing, of a casing having an oil chamber external to the periphery of the said ball bearing, and passages connecting said chamber with the inner side of said bearing, a receptacle for the lubricant located below the ball bearing, and a partition adapted to separate the ball bearing from the said receptacle.

2. The combination with a thrust ball bearing, of a receptacle for the lubricant arranged below, and partly encircling the said ball bearing, the periphery of the ball bearing being separated from the said receptacle, while the inner side of the ball bearing is in open communication with the receptacle through passages.

3. The combination with a thrust ball bearing, of a receptacle for the lubricant located below, and partly encircling the said ball bearing, and a partition adapted to separate the periphery of the ball bearing from said receptacle, the inner side of the ball bearing being in open communication with the said receptacle.

4. The combination with a thrust ball bearing, of a casing therefor which forms a receptacle for the lubricant, said receptacle partly encircling the ball bearing, a partition adapted to separate the periphery of the ball bearing from the receptacle, and a number of rings supporting the ball bearing and said partition and being provided with passages establishing communication between the receptacle and the inner side of the ball bearing.

5. The combination with a thrust ball bearing, of a receptacle for the lubricant, which receptacle partly encircles the said ball bearing, a partition adapted to separate the periphery of the ball bearing from the said receptacle, and means capable of removably fixing the said partition between the ball bearing and the receptacle, the inner side of the ball bearing being in open communication with the receptacle.

6. The combination with a thrust ball bearing, of a receptacle for the lubricant, which receptacle partly encircles the said ball bearing, a partition located between, and adapted to separate the periphery of the ball bearing from said receptacle, and passages adapted to communicate the inner side of the ball bearing with the receptacle.

7. A lubricating device for ball bearings comprising in combination a casing inclosing the bearing and having an oil chamber exterior to the periphery of the bearing with an oil receptacle below the bearing and passages connecting said chamber and receptacle with the interior of the bearing.

In testimony whereof I have signed my name to this specification in the presence of two subscribing witnesses.

FRANZ SYMANZIK.

Witnesses:
　Lilli Schnitzer,
　August Leymftz.